United States Patent
Macfarland

(10) Patent No.: US 6,313,207 B1
(45) Date of Patent: Nov. 6, 2001

(54) FILLED POLYOL COMPONENT VISCOSITY REDUCTION

(76) Inventor: David R. Macfarland, 348 Shellbourne Dr., Rochester Hills, MI (US) 48309

( * ) Notice: Subject to any disclaimer, the term of this patent is extended or adjusted under 35 U.S.C. 154(b) by 0 days.

(21) Appl. No.: 09/304,426

(22) Filed: May 2, 1999

Related U.S. Application Data

(60) Provisional application No. 60/084,171, filed on May 4, 1998.

(51) Int. Cl.$^7$ .......................................................... C08J 3/32
(52) U.S. Cl. .......................... 524/423; 524/424; 524/433; 524/494
(58) Field of Search .................................... 524/423, 424, 524/433, 494

(56) References Cited

U.S. PATENT DOCUMENTS

| | | | |
|---|---|---|---|
| 4,582,887 | * | 4/1986 | Dominguez et al. .................. 528/48 |
| 5,607,998 | * | 3/1997 | Markusch et al. ................... 524/494 |

* cited by examiner

*Primary Examiner*—Kriellion A. Sanders

(57) ABSTRACT

The disclosed invention relates to filled polyol compositions which employ midrange molecular weight polyols and which have specific gravities less than about 1.5 and viscosities less than about 100,000 centipoise at 25 C. The filled polyols are especially suited for manufacture of filled polyurethane compositions.

24 Claims, No Drawings

FILLED POLYOL COMPONENT VISCOSITY REDUCTION

This application claims benefit of Provisional Application Ser. No. 60/084,171 filed May 4, 1998.

FIELD OF THE INVENTION

The invention relates to filled polyols, filled polyurethanes and their method of manufacture.

BACKGROUND OF THE INVENTION

Reaction injection molding ("RIM") is a well-known method for manufacture of molded polyurethane parts. In the RIM method, an isocyanate component is reacted with a polyol component that is filled with Barium Sulfate or other filler materials to produce a filled polyurethane elastomer. The filled polyurethanes may be used in numerous applications, including acoustical insulation for automotive vehicles. When used as acoustical insulation, the filled polyurethanes should have a specific gravity of at least about 1.5.

A long standing problem in achieving filled polyurethanes which have a specitic gravity of at least about 1.5 is that a polyol filled with a sufficient amount of filler to yield this specific gravity has a viscosity of more than 100,000 centipoise ("cps"). This renders use of the filled polyol impractical or impossible in RIM methods.

A need therefore exists for filled polyols which can be employed in RIM methods and which provide filled polyurethanes which have a specific gravity of at least about 1.5 and which have a viscosity less than about 100,000 centipoise at 25° C.

SUMMARY OF THE INVENTION

The invention relates to filled polyols having a specific gravity of at least about 1.5 and a viscosity at 25° C. of less than about 100,000 centipoise. The filled polyols can include at least one polyol of any of low molecular weight polyols, polytetramethylene glycols, midrange molecular weight triols and midrange molecular weight diols, and mixtures thereof, with a a powdered filler material. The filler material is present in an amount sufficient to achieve a specific gravity of at least about 1.5 and a viscosity at 25° C. of less than about 100,000 centipoise.

The invention further relates to a filled polyurethane that is the reaction product of the afore described filled polyol composition an aromatic isocyanate having a functionality of 2.0 or more, or an aliphatic isocyanate having a functionality of 2.0 or more.

The invention advantageously provides filled polyols which have viscosities less then about 100,000 centipoise and which can be used in RIM methods to produce filled polyurethanes.

The invention advantageously enables manufacture of filled polyurethanes which cure to a tack free state in approximately 15 sec. on an aluminum plate heated to 110 F. The specific gravity of filled polyurethanes produced in the invention may vary from about 1.5 to about 10, preferably about 1.6 to about 3, more preferably about 1.7 to about 2.0, most preferably about 1.8.

Having summarized tile invention, the invention is described below in detail by reference to the following detailed description and non-limiting examples.

DETAILED DESCRIPTION OF THE INVENTION

The following tradename materials are given below:

1. Acrol LHT-240 is a propoxylated glycerol that has a molecular weight of 700 number average available from Lyondell Chemical.
2. Acrol LG 168 is a glycerol initiated all propylene oxide triol of number average molecular weight of about 1065 available from Lyondell Chemical.
3. Acrol PPG 425 is a polyoxypropylene diol that has a number average molecular weight of about 425 from Lyondell Chemical.
4. Acrol PPG 725 is a polyoxypropylene diol that has a number average molecular weight of about 760 available from Lyondell Chemical.
5. Antiblaze100 is a flame retardant available from Albright & Wilson Co.
6. Baylith L and Baylith A4 are molecular sieves from Bayer Chemical. Molecular sieves are used to insure that no water is present to cause blowing of the polyurethane elastomer.
7. Dabco 33 LV is a tertiary amine Catalyst available from Air Products and Chemicals Co.
8. Dabco T 12 is a tin catalyst available from Air Products and Chemicals Co.
9. Dabco 8154 is a tertiary amine catalyst from Air Products and Chemicals Co.
10. Dabco T is a tertiary amine catalyst from Air Products and Chemicals Co.
11. Dabco 1027 is a tertiary amine catalyst from Air Products and Chemicals Co.
12. Desmodur W is an aliphatic isocyanate available from Bayer Chemical
13. DETDA is primary amine from Albemarle Corporation.
14. Fomrez UL1 is a Tin Catalyst available from Witco Chemical.
15. Pycol 2 is a flame retardant from AKZO chemical.
16. Pycol 6 is a flame retardant from AKZO chemical.
17. Fycol CEF is a flame retardant from AKZO chemical.
18. Great Lakes DE60F is a flame retardant available from Great Lakes Chemical Co.
19. Jeffamine T403 is a primary triaminc terminated polyether polyol available from Huntsman Chemical.
20. Jeffamine D-230 is a primary diamine terminated polyether polyol available from Huntsman Chemical.
21. Jeffamine D-400 is a primary diamine terminated polyether polyol available from Huntsman Chemical.
22. Polar 1065 barium sulfate is available from Polar Minerals, and has a particle size of about 3–4.5 micron size.
23. Polar 1075 barium sulfate is available from Polar Minerals, and has a median particle size of about 2 microns to about 3 microns.
24. Polycat 8 is amine catalyst from Air Products & Chemicals Co.
25. Polycat 77 is amine catalyst from Air Products & Chemicals Co.
26. Poly G 20-28 is an all propylene oxide diol of 4000 MW available from Arch Chemical.
27. Poly G-55-173 is an ethylene oxide capped diol of 650 MW available from Arch Chemical Co.

28. Poly G 30-56 is all propylene oxide triol of 3000 MW available from Arch Chemical.
29. Rubinol F 428 is a 2000 equivalent weight propylene oxide, ethylene oxide polyether triol with ethylene oxide present at the chain termination, available from ICI Americas.
30. Rubinate M is polymoric diphenylmethane diisocyante available from ICI Americas.
31. Rubinate 1209 is a prepolymer of uretomine modified 4,4' diphenylmethane diisocyante from ICI Americas.
32. Rubinate 1680 is a uretonimine modified pure 4,4'-diphenylmethane diisocyanate of 29–30% NCO available from ICI Americas.
33. Rubinate 1790 is 4,4'-diphenylmethane diisocyanate isocyanate prepolymer of 23% NCO available from ICI Americas.
34. Rubinate 1670 is a uretonimine modified prepolymer of 4,4' diphenylmethano diisocyanate available from ICI Americas.
35. Rubinol XF 460 is 3740 molecular weight ethylene oxide capped diol avaiable from ICI Americas. 36. Rubinol F 456 is an all propylene oxide triol of 2000 MW available from ICI Americas. 37. Stepanol 1752 is a 175 hydroxyl number, 640 molecular weight polyester diol based on orthophalate and diethylene glycol, available from Stepan Chemical.
38. TCPP is a flame retardant/plasticizer available from Courtaulds Chemical.
39. Unirez 2115 is a primary amine available from Union Camp Co.

As used herein, molecular weight ("MW") means number average molecular weight. Low molecular weight is understood to mean a molecular weight of about 62 to about 460. Mid range molecular weight is understood to mean a molecular, weight of about 425 to about 1100.

In accordance with the invention, a filler material and additives are admixed with a polyol to provide a filled polyol composition having a specific gravity of about 1.5 to abut 10.0. The viscosity of the filled polyol is less than about 100,000 cps at 25° C., preferably less than 90,000 cps at 25° C., more preferably less than about 60,000 cps at 25° C., most preferably less than about 20,000 cps at 25° C. The filled polyol is reacted with isocyanate to produce a filled polyurethane.

Polyols

Various polyols may be employed in the invention. The polyols employed are chosen on the basis of molecular weight, functionality, and composition. Polyols which may be employed in the invention include low molecular weight polyester polyols and low molecular weight polytetramethylene glycols each of which have a molecular weight of about 1000 or less, mid range molecular weight triols or diols Acrol PPG-425, Acrol PPG-725, propylene oxide capped and ethylene oxide capped mid range molecular weight diols, preferably Poly-G-55-173; blends of mid-range molecular weight diols such as Acrol PPG 725 and Acrol PPG 425, blends of ethylene oxide ("EO") capped diols such as Poly G-55-173 and midrange molecular weight polyether dials such as Acrol PPG-425, midrange molecular weight triols such as Acrol LHT-240 and Acrol LG-168, as well as blends of these dials and triols. Examples of midrange molecular weight triols which may be employed in the invention include polyoxyalkylene triols and blends of triols which have a molecular weight of about 700 to about 3000, preferably about 500 to about 900, more preferably about 600 to about 800. Preferably, about 80 wt. % to about 100 wt. % of the triol has a molecular weight of about 400 to about 1000. Most preferably, the polyols employed are mid range molecular weight diols such as Acrol PPG-425, Acrol PPG-725, and Poly G-55-173.

Additive Materials

Various additive materials may be included in the filled polyol composition. These additives can include catalysts such as Dabco 33LV, slacking agents such as Baylith L, and flame retardant additives such as TCPP, Great Lakes DE60F, Fycol 2, Fycol 6, Fycol CEF or Antiblaze 100 alone or in combination.

Filler Materials

Various inert filler materials can be admixed with the polyol to achieve a filled polyol that has a specific gravity greater than about 1.5 with a viscosity less than about 100,000 centipoise at 25° C. These filler materials, in the form of powder, include but are not limited to sulfates such barium sulfate and strontium sulfate; carbonates such as calcium carbonate, cesium carbonate, strontium carbonate, and magnesium carbonate; oxides such as iron oxide, alumina, tungsten oxide, titanium oxide, wollastonite and silicon dioxide; silicates such as clays; metal fillers such as Bi and Pb, and carbon. Preferably, the filler material is barium sulfate.

The particle size of the filler can vary over a wide range. The particle size, however, should not be so large as to cause the filler to precipitate out of the filled polyurethane elastomer. Useful particle sizes of barium sulfate filler are about 2 to about 4.5 microns, preferably about 3 to about 4.5 microns. Calcium carbonate may be used in particle sizes of about 3.5 to about 4.5 micron, and glass beads such as K-lite glass beads having a particle size of less than about 44 microns may be employed. Particle sizes of other fillers such as those disclosed above can be readily determined by those skilled in the art.

Isocyanates

Isocyanates which are reacted with the filled polyols include aromatic or aliphatic isocyanates of functionality of 2.0 or more, preferably functionality of about 2.0 to about 3.0, most preferably about 2.2 to about 2.7 such as Rubinate 1209, Rubinate M, Rubinate 1790, Rubinate 1670 or Desmodur W, preferably Rubinate 1209. Examples of isocyanates include toluene diisocyanate, toluene diisocyante prepolymer, 4,4 diphenylmethane diisocyante ("4,4'MDI"), polymeric 4,4'MDI, blends of 4,4'MDI monomers and 4,4'MDI oligomers, pure 4,4'MDI and its isomers, preferably polymeric 4,4'MDI MDI. These isocyanates are liquid at room temperature and having a viscosity less than about 2000 centipoise that 25° C., preferably less than about 1000 centipoise at 25° C., more preferably less than about 500 centipoise at 25° C. Preferably, the isocyanate employed.

Preparation of Filled Polyols

In the examples below, filled polyols are produced by premixing the polyols with various, additives at room temperature under high shear mixing. The filler material then is added incrementally under high shear mixing. In a preferred aspect, the filled polyols of the invention include;

| | |
|---|---|
| Poly G-55-173 | about 90 to about 100 PBW |
| Dabco 33LV | about 0.5 to about 2.0 PBW |
| Fomrez UL-1 | about 0.1 to about 0.5 PBW |
| Baylith L | about 1.0 to about 10 PBW |
| Polar 1065 BaSO$_4$ | about 160 to about 450 PBW |
| TCPP | about 2.0 to about 10.0 PBW | in the preferred polyol formulations above, Ddaco 33LV, may be replaced with amine catalysts such as Dabco 8154, Polycat 8, Dabco T, Dabco 1027 or Polycat 77. Fomrez UL-1 may be replaced by metal catalysts such as dibutyl tin dilaurate, Fomrez UL-22, Stannous Octoate, or Tin Acetate, alone or in combination. Baylith L Powder may be replaced with slaking agents such as calcium oxide.

In an alternative embodiment, the preferred filled polyol formulation can include as a chain extender, 1,4 butane diol, 1,3 butane diol, diethylene glycol, or triethylene glycol alone or in combination functions to produce a filled polyurethanes foam of higher stiffness. Preferably the chain extender is 1,4 Butane Diol in the amount of up to about 10 parts by weight.

In a further alternative embodiment, the preferred filled polyol formulation can include amine terminated polyether polyol to cause rapid gelling of the filled polyurethane formulation so as to minimize the possibility that the reaction injection molded, filled polyurethane foam may run when sprayed on vertical walls. Other amine terminated materials such as DETDA, unirez 2115, Jeffamine D-230, Jeffamine D-400 alone or in combination with Jeffamine T-403 also may be employed. Preferably, Jeffamine T-403, in the amount of up to abut 6 parts by weight may be employed.

In yet a further embodiment, the preferred filled polyol formulation can include both a chain extender, preferably 1,4 Butane diol, and an amine terminated gellation catalyst, preferably Jeffamine T-403.

Most preferably, the filled polyurethane reaction system includes Rubinate 1209 isocyanate and the filled polyol formulation having:

| | |
|---|---|
| Poly G-55-173 | 100.0 parts |
| Jeffamine T-403 | 2.0 parts |
| Dabco 33LV | 0.9 parts |
| Fomrez UL-1 | 0.3 parts |
| Baylith L Powder | 4.0 parts |
| Polar 1065 Barium Sulfate | 350 parts |
| TCPP | 2.0 parts |

Rubinate 1209 is reacted with the preferred filled polyol formulation in an amount of about 14.1 parts/100 parts of the filled polyol formulation, equivalent to an index of 100.

The filled polyurethanes produced from this preferred reaction system above, when the polyol formulation is at 49° C. and impingement mixed at 2000 PSI with Rubinate 1209 at 25° C. and at 2000 PSI at an index of 100 has the following properties

| Property | Test Results |
|---|---|
| Tensile, psi ASTM D-412 | 363 |
| Elongation, % ASTM D-412 | 225 |
| Die C Tear, kN/m ASTM D-624 | 12.7 |
| Specitic Gravity, g/cc ASTM D-792 | 2.07 |
| Shore A hardness | 55. |

Viscosities of the filled polyols of the invention are shown in Table I. All amounts are parts by weight. In all examples in Table 1 except examples 17–19, the barium sulfate is Polar 1065 barium sulfate. Examples 17–19 employ Polar 1075 Barium sulfate.

TABLE 1

Viscosities of Filled Polyols

| Ex./Component | 1 | 2 | 3 | 4 | 5 | 6 | 7 |
|---|---|---|---|---|---|---|---|
| Acrol LHT 240 | 100 | — | — | — | — | — | 100 |
| Acrol LG 168 | — | 100 | — | — | — | — | — |
| Acrol PPG 425 | — | — | — | — | — | — | — |
| Acrol PPG 725 | — | — | — | — | — | — | — |
| Baylith L | 4 | 4 | 4 | 4 | 4 | 4 | 4 |
| BaSO$_4$ | 160.8 | 160.8 | 160.8 | 160.8 | 160.8 | 160.8 | 160.8 |
| Dabco 33 LV | 0.9 | 0.9 | 0.9 | 0.9 | 0.9 | 0.9 | 0.9 |
| Ethylene glycol | — | — | — | — | 4.5 | 4.5 | — |
| DEG[1] | — | — | — | — | 1.5 | 1.5 | — |
| Fomrez UL1 | 0.3 | 0.3 | 0.3 | 0.3 | 0.3 | 0.3 | 0.3 |
| Jeffamine 403 | — | — | — | — | — | — | — |
| Poly C 30-56 | — | — | 100 | — | — | — | — |
| Poly G 20-28 | — | — | — | — | — | 100 | — |
| PPG-MW 64[2] | — | — | — | — | — | — | — |
| DPG-MW 106[3] | — | — | — | — | — | — | — |
| DPG-MW 134[4] | — | — | — | — | — | — | — |
| DPG-MW 192[5] | — | — | — | — | — | — | — |
| Rubinol F 456 | — | — | — | 100 | — | — | — |
| Rubinol F 428 | — | — | — | — | 50 | — | — |
| Rubinol XF 460 | — | — | — | — | 50 | — | — |
| TCPP | — | — | — | — | — | — | — |
| Viscosity cps[6] | 5200 | 19000 | 90000 | +100000 | 63000 | +100000 | 1900 |

| Ex./Component | 8 | 9 | 10 | 11 | 12 | 13 | 14 | 15 |
|---|---|---|---|---|---|---|---|---|
| Acrol LHT 240 | — | — | — | — | — | — | — | — |
| Acrol LG 168 | — | — | — | — | — | — | — | — |
| Acrol PPG 425 | — | 100 | — | — | — | — | — | 100 |
| Acrol PPG 725 | 100 | — | — | — | — | — | — | — |

TABLE 1-continued

Viscosities of Filled Polyols

| Ex./Component | | | | | | | | |
|---|---|---|---|---|---|---|---|---|
| Baylith L | 4 | 4 | 4 | 4 | 4 | 4 | 4 | 4 |
| BaSO$_4$ | 160.8 | 160.8 | 160.8 | 160.8 | 241.2 | 241.2 | 241.2 | 241.2 |
| Dabco 33 LV | 0.9 | 0.9 | 0.9 | 0.9 | 0.9 | 0.9 | 0.9 | 0.9 |
| Ethylene glycol | — | — | — | — | — | — | — | — |
| Fomrez UL1 | 0.3 | 0.3 | 0.3 | 0.3 | 0.3 | 0.3 | 0.3 | 0.3 |
| DEG[1] | — | — | — | — | — | — | — | — |
| Jeffamine 403 | — | — | — | — | — | — | — | — |
| Poly C 30-56 | — | — | — | — | — | — | — | — |
| Poly G 20-28 | — | — | — | — | — | — | — | — |
| Poly G 55-173 | — | — | 100 | 100 | — | — | — | — |
| PPG-MW 64[2] | — | — | — | — | 100 | — | — | — |
| DPG-MW 106[3] | — | — | — | — | — | 100 | 100 | — |
| DPG-MW 134[4] | — | — | — | — | — | — | — | — |
| DPG-MW 192[5] | — | — | — | — | — | — | — | — |
| Rubinol F 456 | — | — | — | — | — | — | — | — |
| Rubinol F 428 | — | — | — | — | — | — | — | — |
| Rubinol XF 460 | — | — | — | — | — | — | — | — |
| TCPP | — | — | — | — | — | — | — | — |
| Viscosity[6] | 1200 | 950 | 1200 | 31000 | 8000 | 2000 | 2900 | 8000 |

| Ex./Component | 16 | 17 | 18 | 19 | 20 | 21 | 22 | 23 | 24 |
|---|---|---|---|---|---|---|---|---|---|
| Acrol LHT 240 | — | 100 | — | — | — | — | — | — | — |
| Acrol LG 168 | — | — | — | 100 | — | — | — | — | — |
| Acrol PPG 425 | — | — | — | — | — | — | — | — | — |
| Acrol PPG 725 | — | — | 100 | — | — | — | — | 100 | — |
| Baylith L | 4 | 4 | 4 | 4 | 4 | 4 | 4 | 4 | 4 |
| BaSO$_4$ | 241.2 | 241.2 | 241.2 | 241.2 | 350 | 350 | 350 | 350 | 350 |
| Dabco 33 LV | 0.9 | 0.9 | 0.9 | 0.9 | 0.9 | 0.9 | 0.9 | 0.9 | 0.9 |
| Ethylene glycol | — | — | — | — | — | — | — | — | — |
| Fomrez UL1 | 0.3 | 0.3 | 0.3 | 0.3 | 0.3 | 0.3 | 0.3 | 0.3 | 0.3 |
| DEG[1] | — | — | — | — | — | — | 100 | — | — |
| Jeffamine 403 | — | — | — | — | — | — | — | — | — |
| Poly G 30-56 | — | — | — | — | — | — | — | — | — |
| Poly G 20-28 | — | — | — | — | — | — | — | — | — |
| Poly G 55-173 | — | — | — | — | — | — | — | — | — |
| PPG-MW 64[2] | — | — | — | — | 100 | — | — | — | — |
| DPG-MW 106[3] | — | — | — | — | — | — | — | — | — |
| DPG-MW 134[4] | — | — | — | — | — | 134 | — | — | — |
| TPG-MW 192[5] | 100 | — | — | — | — | — | — | — | 100 |
| Rubinol F 456 | — | — | — | — | — | — | — | — | — |
| Rubinol F 428 | — | — | — | — | — | — | — | — | — |
| Rubinol XF 460 | — | — | — | — | — | — | — | — | — |
| TCPP | — | — | — | — | — | — | — | — | — |
| Viscosity[6] | 4000 | 58000 | 56000 | 63000 | 9500 | 5000 | 8500 | 64000 | 18500 |

| Ex./Component | 25 | 26 | 27 | 28 | 29 | 30 | 31 | 32 |
|---|---|---|---|---|---|---|---|---|
| Acrol LHT 240 | — | — | — | — | — | — | 100 | 50 |
| Acrol LG 168 | — | — | — | — | — | — | — | — |
| Acrol PPG 425 | 25 | 25 | 50 | — | 25 | — | — | — |
| Acrol PPG 725 | 75 | 75 | 50 | 100 | — | — | — | 50 |
| Baylith L | 4 | 4 | 4 | 4 | 4 | 4 | 4 | 4 |
| BaSO$_4$ | 350 | 350 | 350 | 350 | 350 | 350 | 350 | 350 |
| Dabco 33 LV | 0.9 | 0.9 | 0.9 | 0.9 | 0.9 | 0.9 | 0.9 | 0.9 |
| Ethylene glycol | — | — | — | — | — | — | — | — |
| Fomrez UL1 | 0.3 | 0.3 | 0.3 | 0.3 | 0.3 | 0.3 | 0.3 | 0.3 |
| DEG[1] | — | — | — | — | — | — | — | — |
| Jeffamine 403 | 2 | — | — | — | 2 | — | — | — |
| Poly G 30-56 | — | — | — | — | — | — | — | — |
| Poly G 20-28 | — | — | — | — | — | — | — | — |
| Poly G 55-173 | — | — | — | — | 75 | 100 | — | — |
| PPG-MW 64[2] | — | — | — | — | — | — | — | — |
| DPG-MW 106[3] | — | — | — | — | — | — | — | — |
| DPG-MW 134[4] | — | — | — | — | — | — | — | — |
| DPG-MW 192[5] | — | — | — | — | — | — | — | — |
| Rubinol F 456 | — | — | — | — | — | — | — | — |
| Rubinol F 428 | — | — | — | — | — | — | — | — |
| Rubinol XF 460 | — | — | — | — | — | — | — | — |
| TCPP | — | 2 | — | — | 2 | — | — | — |
| Viscosity[6] | 80000 | 40000 | 51000 | 89000 | 22500 | 27000 | 100000 | 72500 |

TABLE 1-continued

Viscosities of Filled Polyols

| Ex./Component | 33 | 34 | 35 | 36 | 37 | 38 | 39 |
|---|---|---|---|---|---|---|---|
| Acrol LHT 240 | — | — | 100 | — | — | — | — |
| Acrol LG 168 | — | — | — | — | — | — | — |
| Acrol PPG 425 | 25 | — | — | — | 100 | — | — |
| Acrol PPG 725 | 75 | 100 | — | 100 | — | — | — |
| Baylith L | 4 | 4 | 4 | 4 | 4 | 4 | 4 |
| $BaSO_4$ | 350 | 350 | 160.8 | 160.8 | 160.8 | 160.8 | 160.8 |
| Dabco 33 LV | 0.9 | 0.9 | 0.9 | 0.9 | 0.9 | 0.9 | 0.9 |
| Ethylene glycol | — | — | — | — | — | — | — |
| Fomrez UL1 | 0.3 | 0.3 | 0.3 | 0.3 | 0.3 | 0.3 | 0.3 |
| DEG[1] | — | — | — | — | — | — | — |
| Jeffamine 403 | — | — | — | — | — | — | — |
| Poly G 30-56 | — | — | — | — | — | — | — |
| Poly G 20-28 | — | — | — | — | — | — | — |
| Poly G 55-173 | — | — | — | — | — | 100 | 100 |
| PPG MW 64[2] | — | — | — | — | — | — | — |
| DPG-MW 106[3] | — | — | — | — | — | — | — |
| DPG-MW 134[4] | — | — | — | — | — | — | — |
| DPG-MW 192[5] | — | — | — | — | — | — | — |
| Rubinol F 456 | — | — | — | — | — | — | — |
| Rubinol F 428 | — | — | — | — | — | — | — |
| Rubinol XF 460 | — | — | — | — | — | — | — |
| TCPP | — | — | — | — | — | — | — |
| Viscosity[6] | 40000 | 89000 | 1900 | 1200 | 950 | 1200 | 31000 |

[1]Diethylene glycol
[2]Polypropylene glycol-MW 64
[3]Dipropylene glycol-MW 106
[4]Dipropylene glycol-MW 134
[5]Tripropylene glycol-MW 192
[6]Brookfield Viscosity at 25° C.

Production of Filled Polyurethanes

The filled polyols produced in the invention are reaction injection molded with polyisocyanates to produce filled polyurethanes. During the reaction injection molding, the isocyanate, typically at about 25° C., is impingement mixed with the filled polyol, typically at about 49° C. The isocyanate and filled polyol typically are each at a mix pressure of about 2000 PSI during the reaction.

The properties of filled polyurethanes produced are shown in Tables IV and V. The molecular weight/cross link ("$N_c$") of the filled polyurethanes shown in Table II is calculated in the following manner: $M_c$=(Final net Polymer weight)/(total moles of polyol in excess of 2.0 functionality+moles of isocyanate in excess of stoichiometric equivalence+total moles of isocyanate in excess of 2.0 functionality)

TABLE 2

Filled Polyurethanes

| Ex./Component | 40 | 41 | 42 | 43 | 44 | 45 |
|---|---|---|---|---|---|---|
| Acrol LHT-240 | — | — | — | — | — | 100 |
| Acrol PPG-425 | — | — | — | 100 | — | — |
| Acrol PPG-725 | — | — | — | — | — | — |
| $BaSO_4$ | 350 | 350 | 350 | 350 | 350 | 350 |
| Baylith L | 4 | 4 | 4 | 4 | 4 | 4 |
| Dabco 33LV | 0.9 | 0.9 | 0.9 | 0.9 | 0.9 | 0.9 |
| DEG-106 MW[1] | — | — | 100 | — | — | — |
| DPG-134 MW[2] | — | 100 | — | — | — | — |
| Fomrez UL-1 | 0.3 | 0.3 | 0.3 | 0.3 | 0.3 | 0.3 |
| Jeffamine T-403 | — | — | — | — | — | — |
| Poly G-55-173 | — | — | — | — | — | — |
| PPG-64 MW[3] | 100 | — | — | — | — | — |
| TCPP | — | — | — | — | — | — |
| TPG-192 MW[4] | — | — | — | — | 100 | — |
| Filled Polyol Viscosity | 9500 | 5000 | 8500 | 64000 | 18500 | 100000 |
| Temp ° C. @ which viscosity measured | 24.3 | 24.5 | 25.2 | 24.6 | 25.6 | 25 |
| Isocyanate | Rubinate 1209 | Rubinate 1209 | Rubinate 1209 | Rubinate 1209 | Rubinate 1209 | Rubinate 1209 |
| Index | 105 | 105 | 105 | 105 | 105 | 105 |
| g isocyanate/ | — | — | — | — | — | 20.2 |

TABLE 2-continued

Filled Polyurethanes

| 100 g filled polyol blend | | | | | | |
|---|---|---|---|---|---|---|
| Shore A | — | 93 | 98 | 87 | 98 | — |
| Shore D | 80 | 76 | 48 | 38 | 71 | — |
| $M_w$, neat polymer | — | — | — | — | — | 1024 |
| Total hard segment, neat polymer | — | — | — | — | — | 6.88 |

| Ex./Component | 46 | 47 | 48 | 49 | 50 | 51 |
|---|---|---|---|---|---|---|
| Acrol LHT-240 | 50 | — | — | — | — | — |
| Acrol PPG-245 | | 25 | 25 | 25 | 25 | 25 |
| Acrol PPG-725 | 50 | 75 | 75 | 75 | 75 | 75 |
| BaSO$_4$ | 350 | 350 | 350 | 350 | 350 | 350 |
| Baylith L | 4 | 4 | 4 | 4 | 4 | 4 |
| Dabco 33LV | 0.9 | 0.9 | 0.9 | 0.9 | 0.9 | 0.9 |
| DEG-106 MW[1] | 0.3 | 0.3 | 0.3 | 0.3 | 0.3 | 0.3 |
| DPG-134 MW[2] | — | — | — | — | — | — |
| Fomrez UL-1 | — | — | — | — | — | — |
| Jeffamine T-403 | 2 | 2 | 2 | 2 | 2 | 2 |
| Poly G-55-173 | — | — | — | — | — | — |
| PPG-64 MW[3] | — | — | — | — | — | — |
| TCPP | — | — | — | — | — | 2 |
| TPG-192 MW[4] | — | — | — | — | — | — |
| Filled Polyol Viscosity | 72500 | 80000 | 80000 | 80000 | 80000 | 40000 |
| Temp ° C. @ which viscosity measured | 25 | 25 | 25 | 25 | 25 | 25 |
| Isocyanate | Rubinate 1209 | Rubinate M | Rubinate 1670 | Rubinate 1209 | Rubinate 1209 | Rubinate 1209 |
| Index | 105 | 105 | 105 | 105 | 100 | 100 |
| g isocyanate/100 g filled polyol blend | 16.5 | 10.3 | 12.4 | 15.1 | 144 | 14.3 |
| Shore A | — | — | — | — | — | — |
| Shore D | — | — | — | — | — | — |
| $M_w$, neat polymer | 1667 | 1329 | 5421 | 4608 | 8216 | 8216 |
| Total hard segment, neat polymer | 6.39 | 4.8 | 10.72 | 6.10 | 4.87 | 4.87 |

| Ex./Component | 52 | 53 | 54 | 55 | 56 | 57 |
|---|---|---|---|---|---|---|
| Acrol LHT-240 | — | — | — | — | — | — |
| Acrol PPG-425 | 50 | — | 25 | 25 | — | 100 |
| Acrol PPG-725 | 50 | 100 | — | — | — | — |
| BaSO$_4$ | 350 | 350 | 350 | 350 | 350 | 350 |
| Baylith L | 4 | 4 | 4 | 4 | 4 | 4 |
| Dabco 33LV | 0.9 | 0.9 | 0.9 | 0.9 | 0.9 | 0.9 |
| DEG-106 MW[1] | — | — | — | — | — | — |
| DPG-134 MW[2] | — | — | — | — | — | — |
| Fomrez UL-1 | 0.3 | 0.3 | 0.3 | 0.3 | 0.3 | 0.3 |
| Jeffamine T-403 | — | — | 2 | 2 | — | — |
| Poly G-55-173 | — | — | 75 | 75 | 100 | — |
| PPG-64 MW[3] | — | — | — | — | — | — |
| TCPP | — | — | — | — | — | — |
| TPG-192 MW[4] | — | — | — | — | — | — |
| Filled Polyol viscosity | 51000 | 89000 | 22500 | 22500 | 27500 | 64000 |
| Temp ° C. @ which viscosity measured | 25 | 25 | 25 | 25 | — | — |
| Isocyanate | Rubinate 1209 | Rubinate 1670 | Rubinate 1209 | Rubinate 1670 | Rubinate 1670 | Rubinate 1209 |
| Index | 105 | 105 | 100 | 100 | 100 | 100 |
| g isocyanate/100 g filled polyol blend | 16.9 | 10.1 | 15.8 | 13.1 | 11.3 | 13.6 |
| Shore A | — | — | — | — | — | — |
| Shore D | — | — | — | — | — | — |

TABLE 2-continued

Filled Polyurethanes

| | | | | | | |
|---|---|---|---|---|---|---|
| $M_w$, neat polymer | 4309 | 21937 | 10050 | 9339 | 10091 | 8552 |
| Total hard segment, neat polymer | 6.52 | 8.35 | 5.03 | 9.58 | 9.04 | 5.51 |

[1]Diethylene glycol, MW 106
[2]Dipropylene glycol, MW 134
[3]Propylene glycol, MW 64
[4]Tripropylene glycol, MW 192

The filled polyurethanes preferably are produced by RIM. Other methods for production of the filled polyurethanes of the invention include reverse roll coating and doctor blading. The filled polyurethanes of the invention may be used in automotive acoustical packages slash as the mass layer on dash insulator, carpet backing, wheel houses or any application requiring a high specific gravity elastomer. Other uses for the filled polyurethanes include sound insulation of machines such as compressors, industrial generators, sound isolation in heavy equipment or heavy trucks. In non-automotive applications these polyurethanes may be used alone or in combination with a decoupler for application Lo metal structures to reduce noise, and as sound insulation on office walls. Others uses include use in speaker housings.

What is claimed is:

1. A filled polyol composition having a specific gravity of at least about 1.5 and a viscosity at 25° C. If less than about 100,000 centipoise comprising:
   a) at least one polyol selected from the group consisting of triols, diols, and mixtures thereof, wherein said polyol has a number average molecular weight of about 425 to about 1100, and
   b) a powdered filler material present in an amount of at least 57% by weight based on the total weight of the composition.

2. The filled polyol composition of claim 1, wherein said triols are selected from the group consisting of propoxylated glycerol of about 700 MW and glycerol initiated all propylene oxide triol of about 1065 MW, and said diols are selected from the group consisting of polyoxypropylene diols of about 425 MW, polyoxypropylene diols of about 760 MW, and ethylene oxide capped diols of 650 MW.

3. The filled polyol composition of claim 2 wherein the powder filler material is selected from the group of sulfates, carbonates, oxides, silicates, glass, metals and carbon.

4. The filled polyol composition of claim 3 wherein the particle size of the filler material is in the range of about 2 to about 44 microns.

5. The composition of claim 4 further comprising a tertiary amine catalyst,
   wherein the filler material is barium sulfate, and the polyol is ethylene oxide capped diol of 650 MW.

6. The composition of claim 5 wherein the ethylene oxide capped diol of about 650 MW is present in the composition in an amount of about 90 to about 100 parts by weight, and the barium sulfate is present in the composition in an amount of about 160 to about 450 parts by weight.

7. The composition of claim 6 wherein the tertiary amine catalyst is present in an amount of about 0.5 to about 2.0 parts by weight.

8. The composition of claim 1 further comprising a chain extender selected from the group consisting of 1,4 butane diol, 1,3 butane diol, diethylene glycol, triethylene glycol, and mixtures thereof.

9. The composition of claim 1 further comprising a primary triamine terminated catalyst.

10. The composition of claim 1 further comprising a chain extender and a primary triamine terminated catalyst.

11. A filled polyol composition having a specific gravity of at least about 1.5 and a viscosity at 25° C. of less than about 100,000 centipoise comprising
   about 100 parts ethylene oxide capped diol of 650 MW, about 0.9 parts amine catalyst, about 0.3 parts tin catalyst, and about 350 parts Barium Sulfate having a particle size of about 3 microns to about 4.5 microns.

12. The composition of claim 11 further comprising about 2.0 parts primary polyether polyol.

13. A filled polyurethane comprising the reaction product of a filled polyol composition having a specific gravity of at least about 1.5 and a viscosity at 25° C. of less than about 100,000 centipoise, said composition comprising:
   a) at least one polyol selected from the group consisting of triols, diols, and mixtures thereof, wherein said polyol has a number average molecular weight of about 425 to about 1100,
   b) a powdered filler material present in an amount of at least 57% by weight based on the total weight of the composition, and
   c) an aromatic isocyanate having a functionality of 2.0 or more, or an aliphatic isocyanate having a functionality of 2.0 or more.

14. The filled polyurethane of claim 13, wherein, said triols are selected from the group consisting of propoxylated glycerol of about 700 MW and glycerol initiated all propylene oxide triol of about 1065 MW, said diols are selected from the group consisting of polyoxypropylene diols of about 425 MW, polyoxypropylene diols of about 760 MW, and ethylene oxide capped diols of 650 MW, and said isocyanate has a functionality of about 2.0 to about 3.0.

15. The filled polyurethane of claim 14, wherein said powdered filler material is selected from the group consisting of sulfates, carbonates, oxides, silicates, glass, metals and carbon, and said isocyanate has a functionality of about 2.2 to about 2.7.

16. The filled polyurethane of claim 15, wherein the particle size of said filler material is in the range of about 2 to about 44 microns, said isocyanate is selected from the group consisting of an aliphatic isocyanate, an isocyanate prepolymer having about 75% uretonimine modified 4,4' diphenylmethane diisocyanate prepolymer and about 25% of a 2000 equivalent weight propylene oxide, ethylene oxide polyether triol with ethylene oxide present at the chain termination, polymeric 4,4' diphenylmethane diisocyanate, a 4,4' diphenylmethane diisocyanate prepolymer having about 23% free NCO groups, and a uretonimine modified prepolymer of 4,4' methylene diphenyl diisocyanate.

17. The filled polyurethane of claim 16 further comprising an amine catalyst, and wherein said filler material is barium sulfate, said polyol is ethylene oxide capped diol of 650 MW, and said isocyanate is an isocyanate prepolymer having about 75% uretonimine modified 4,4' diphenylmethane diisocyanate prepolymer and about 25% of a 2000 equivalent weight propylene oxide, ethylene oxide polyether triol with ethylene oxide present at the chain termination.

18. The filled polyurethane of claim 17, wherein said ethylene oxide capped diol of 650 MW is present in the composition in an amount of about 90 to about 100 parts by weight, and the barium sulfate is present in the composition in an amount of about 160 to about 450 parts by weight.

19. The filled polyurethane of claim 18, wherein the amine catalyst is present in an amount of about 0.5 to about 2.0 parts by weight.

20. The filled polyurethane of claim 14 further comprising a chain extender selected from the group consisting of 1,4-butane diol, 1,3-butane diol, diethylene glycol, triethylene glycol, and mixtures thereof.

21. The filled polyurethane of claim 14 further comprising a primary amine terminated polyether polyol.

22. The filled polyurethane of claim 16 further comprising a chain extender and a primary amine terminated polyether polyol.

23. The filled polyol composition of claim 1, wherein said composition has a specific gravity of at least 1.8.

24. The filled polyol composition of claim 1, wherein said filler material comprises from about 57% to about 83% by weight composition.

* * * * *